United States Patent
Kashyap

(10) Patent No.: US 7,730,214 B2
(45) Date of Patent: Jun. 1, 2010

(54) COMMUNICATION PATHS FROM AN INFINIBAND HOST

(75) Inventor: Vivek Kashyap, Beaverton, OR (US)

(73) Assignee: International Business Machines Corporation, Armonk, NY (US)

( * ) Notice: Subject to any disclaimer, the term of this patent is extended or adjusted under 35 U.S.C. 154(b) by 609 days.

(21) Appl. No.: 11/614,057

(22) Filed: Dec. 20, 2006

(65) Prior Publication Data

US 2008/0155107 A1    Jun. 26, 2008

(51) Int. Cl.
G06F 15/16    (2006.01)
(52) U.S. Cl. .................. 709/249; 709/230; 370/401
(58) Field of Classification Search .................. 709/249
See application file for complete search history.

(56) References Cited

U.S. PATENT DOCUMENTS

| | | | |
|---|---|---|---|
| 6,728,777 B1 | 4/2004 | Lee et al. | |
| 6,904,507 B2 | 6/2005 | Gil | |
| 7,475,153 B2* | 1/2009 | Hufferd | 709/230 |
| 2004/0022245 A1* | 2/2004 | Forbes et al. | 370/392 |
| 2004/0022257 A1* | 2/2004 | Green et al. | 370/401 |
| 2004/0024903 A1* | 2/2004 | Costatino et al. | 709/238 |
| 2004/0125818 A1 | 7/2004 | Richardson et al. | |
| 2005/0038909 A1 | 2/2005 | Yoshiba et al. | |
| 2005/0144313 A1* | 6/2005 | Arndt et al. | 709/238 |
| 2005/0198250 A1 | 9/2005 | Wang | |
| 2006/0013251 A1* | 1/2006 | Hufferd | 370/466 |
| 2006/0013253 A1* | 1/2006 | Hufferd | 370/466 |
| 2006/0146999 A1* | 7/2006 | Thompson et al. | 379/88.18 |
| 2006/0222004 A1* | 10/2006 | Beukema et al. | 370/466 |
| 2006/0245371 A1* | 11/2006 | Joiner et al. | 370/252 |
| 2007/0014308 A1* | 1/2007 | Gunthorpe et al. | 370/466 |
| 2007/0143523 A1* | 6/2007 | Wilkinson et al. | 710/315 |
| 2007/0223446 A1* | 9/2007 | McMenamy et al. | 370/351 |

* cited by examiner

*Primary Examiner*—Firmin Backer
*Assistant Examiner*—Hamza Algibhah
(74) *Attorney, Agent, or Firm*—Lieberman & Brandsdorfer, LLC

(57) ABSTRACT

A method and apparatus are provided for selecting an optimal communication path between an IB computer and a non-IB computer. All gateways that join the network multicast their presence on the network. The data associated with the multicast transmission are retained by each member of the network in the associated cache. The retained multicast data is leveraged to select an optimal transmission protocol between the host and target computers, and a gateway configured to support the selected transmission protocol.

19 Claims, 4 Drawing Sheets

COMMUNICATION PATHS FROM AN INFINIBAND HOST

BACKGROUND OF THE INVENTION

1. Technical Field

This invention relates to selecting an optimal communication path over a computer network. More specifically, the invention relates to a computer network configured with a computer operating in an InfiniBand network and a computer operating in a non-InfiniBand network, and a set of protocols to determine an optimal gateway for transmitting messages between the computers.

2. Description of the Prior Art

Input/Output (I/O) networks, such as system buses, are used by a processor to communicate with peripherals, such as network adapters. However, constraints in the architectures of common I/O networks, such as the Peripheral Component Interface (PCI) bus, limit the overall performance of computers. As a result, new types of I/O networks have been introduced.

One type of I/O network is known and referred to as the InfiniBand network, hereinafter IB. InfiniBand is an I/O architecture and specification for transmission of data between processors and I/O devices. Instead of sending data in parallel, which is the structure for sending data in PCI, IB send data in serial and can carry multiple channels of data at the same time in a multiplexing signal. The IB network replaces the PCI or other bus currently found in computers with a packet-switched network, complete with zero or more routers. FIG. 1 is a prior art block diagram (100) of a system area network based on the IB architecture. The IB network is broken up into separate autonomous management units, each containing multiple IB nodes, called subnets. As shown, there are six nodes, $node_0$ (102), $node_1$ (104), $node_2$ (106), $node_3$ (108), $node_4$ (110), and $node_5$ (112) interconnected by a fabric (120) consisting of three switches, $switch_0$ (122), $switch_1$ (124), and $switch_2$ (126). Each node connects to the fabric (120) through a channel adapter. The IB specification classifies the channel adapters into two categories, host channel adapters (HCA) and target channel adapters (TCA). The HCA is an interface that is used to integrate the IB with the operating system. The TCA is present on I/O devices, such as a RAID subsystem. As shown in FIG. 1, $node_2$ (106), $node_3$ (108), and $node_5$ (112) represent peripherals and include TCAs (136), (138), and (142), respectively. Similarly, $node_0$ (102), $node_1$ (104), and $node_4$ (110) represent operating systems and include HCAs (132), (134), and (140), respectively. Furthermore, in the example shown herein, each channel adapter may have one or more ports. A channel adapter with more than one port may be connected to multiple switch ports. For example, channel adapter (140) has at least two ports, with a first port connected to $switch_0$ (122) and a second port connected to $switch_1$ (124). Accordingly, as shown multiple paths between a source and a destination are available in the IB architecture, resulting in performance and reliability benefits.

IB components are assigned a global identifier (GID) during initialization. The GID is used to uniquely identify the target component both within and across IB subnets. A router may be provided to interconnect two or more subnets to form a larger system area network. IB Routers, like IB switches, forward packets between their ports. The difference between routers and switches is that a router is used to interconnect two or more subnets to form a larger multi-domain system area network. Within a subnet, each port is assigned a unique identifier called the local identifier (LID). Switches make use of the LIDs for routing packets from the source to the destination, whereas routers make use of the GIDs for routing packets across domains.

In order for an application to communicate with another application over the IB architecture, it must first create a work queue that consists of a queue pair, which is a pair of queues—one queue for send requests and one queue for receive requests. In order for the application to execute an operation it must place a work queue element (WQE) in the work queue. Thereafter, the operation is picked up for execution by the channel adapter. Accordingly, the work queue forms the communication medium between applications and the channel adapter.

By having multiple paths available for transmitting data between nodes, the fabric is able to achieve transfer rates at the full capacity of the communication channel, avoiding congestion issues that may arise in shared bus architecture.

Remote direct memory access (RDMA) is a communications technique used in IB that allows data to be transmitted from the memory of one computer to the memory of another computer without passing through either device's CPU, without needing extensive buffering, and without calling to an operating system kernel. Through RDMA, data can be transferred faster since it does not have to pass through the CPU. Although RDMA is supported in the IB architecture, it is not universally supported across all networks. There are circumstances where a computer on a non-IB network is in communication with a computer on an IB network and data transfer and communication between the two computers is warranted. Such communication utilizes gateways between the IB and non-IB network to transfer data packets between the two networks. A gateway is a node that serves as an entrance to another network. It is known in the art that a gateway can support RDMA data transfer between an IB network and a non-IB network. However, the prior art solutions available for determining an optimal path for data transfer in such a circumstance are complex and costly. Accordingly, there is a need for a solution that efficiently determines an optimal communication path and data transfer technique between an RDMA configured gateway and a generic gateway, such as IPoIB, that are in communication with the IB network.

SUMMARY OF THE INVENTION

This invention comprises a method and apparatus for efficiently communicating data between an IB host computer and a non-IB target computer.

In one aspect of the invention, a method is provided for determining a communication path on a computer network. A computer network is configured with an IB configured host computer in communication across the network with a non-IB configured target computer. The network includes at least two separate gateways that are in communication with both the host and target computers. One of the gateways is an IPoIB gateway, and the second of the gateways is an iSER gateway. An address of the target computer is determined. Thereafter, an optimal gateway is selected to communicate data from the host computer to the target computer based upon the determined address of the target. The process of selecting one of the gateways for transmission of an internetwork communication includes sending a request to the first and second gateways, receiving a response from the gateways, and determining an optimal gateway to use based upon the received response. Following selection of the gateway, the target computer is contacted over the selected gateway using a remote direct memory access protocol if the target computer and one of the gateways are configured to accept the remote direct memory access protocol.

In another aspect of the invention, a computer system is provided with an IB configured host computer in communication with an iSCSI configured target computer across a network. At least two gateways are provided in the network that is in communication with the host processor and the target processor. A manager is provided to select one of the gateways to communicate data from the host computer to the target computer based upon an address of the target computer on the network. The selection includes a request message sent to the gateways from the host computer, a response message communicated to the host computer from the gateways, and a determination of an optimal gateway for communication with the target based upon the response message. Based upon the response message, a transmission manager contacts the target computer over the selected gateway using a remote direct memory access protocol if the target computer and one of the gateways are configured to accept the remote direct memory access protocol.

In a further aspect of the invention, an article is provided with an IB configured host computer in communication across a network with an iSCSI configured target computer. The network includes at least two separate gateways in communication with the host and target computers. One of the gateways is an IPoIB gateway and the second gateway is an iSER gateway. The article also includes a tangible computer readable carrier including computer program instructions configured to determine a communication path on the network. Instructions are provided to determine an address of the target computer, and to select a gateway to facilitate communication between the host and target computers based upon the determined address. These instructions include sending a request to the gateways, receiving a response from the gateways, and determining an optimal gateway to use based upon the received response. Instructions are provided to cause communication with the target computer over the selected gateway using a remote direct memory access protocol if the target computer and one of the gateways are configured to accept the remote direct memory access protocol.

In an even further aspect of the invention, a method is provided for determining a communication path on a computer network. A computer network is configured with a host computer in communication across the network with a target computer. The network includes at least two separate gateways that are in communication with both the host and target computers. An address of the target computer is determined. Thereafter, one of the gateways is selected to communicate data from the host computer to the target computer based upon the determined address of the target. The process of selecting one of the gateways for transmission of a communication includes sending a request to the first and second gateways, receiving a response from the gateways, and determining an optimal gateway to use based upon the received response. Following selection of the gateway, the target computer is contacted over the selected gateway using a remote direct memory access protocol if the target computer and one of the gateways are configured to accept the remote direct memory access protocol.

Other features and advantages of this invention will become apparent from the following detailed description of the presently preferred embodiment of the invention, taken in conjunction with the accompanying drawings.

DESCRIPTION OF THE PREFERRED EMBODIMENT

Overview

Internet SCSI (iSCSI) is a network protocol standard for linking data storage devices over a network and transferring data by carrying SCSI commands over internet protocol, IP, networks. In the context of data communication and storage, iSCSI allows communication with a remote processor or I/O through a gateway, wherein the remote processor or I/O appears as a locally attached element. However, a gateway that supports iSCSI communication does not conventionally support remote direct memory access (RDMA) communication. iSCSI extensions for RDMA, iSER, support RDMA data transfer. An iSER gateway is a node that supports RDMA data transfer from an IB network to an Internet Protocol (IP) network. An IB network, which supports RDMA communication, utilizes one or more gateways to connect one IB network to another IB network, or to connect an IB network to a non-IB network. An IB multicast tool is leveraged to determine an optimal path for supporting RDMA communication between an IB host computer and a non-IB target computer.

Figure 1:
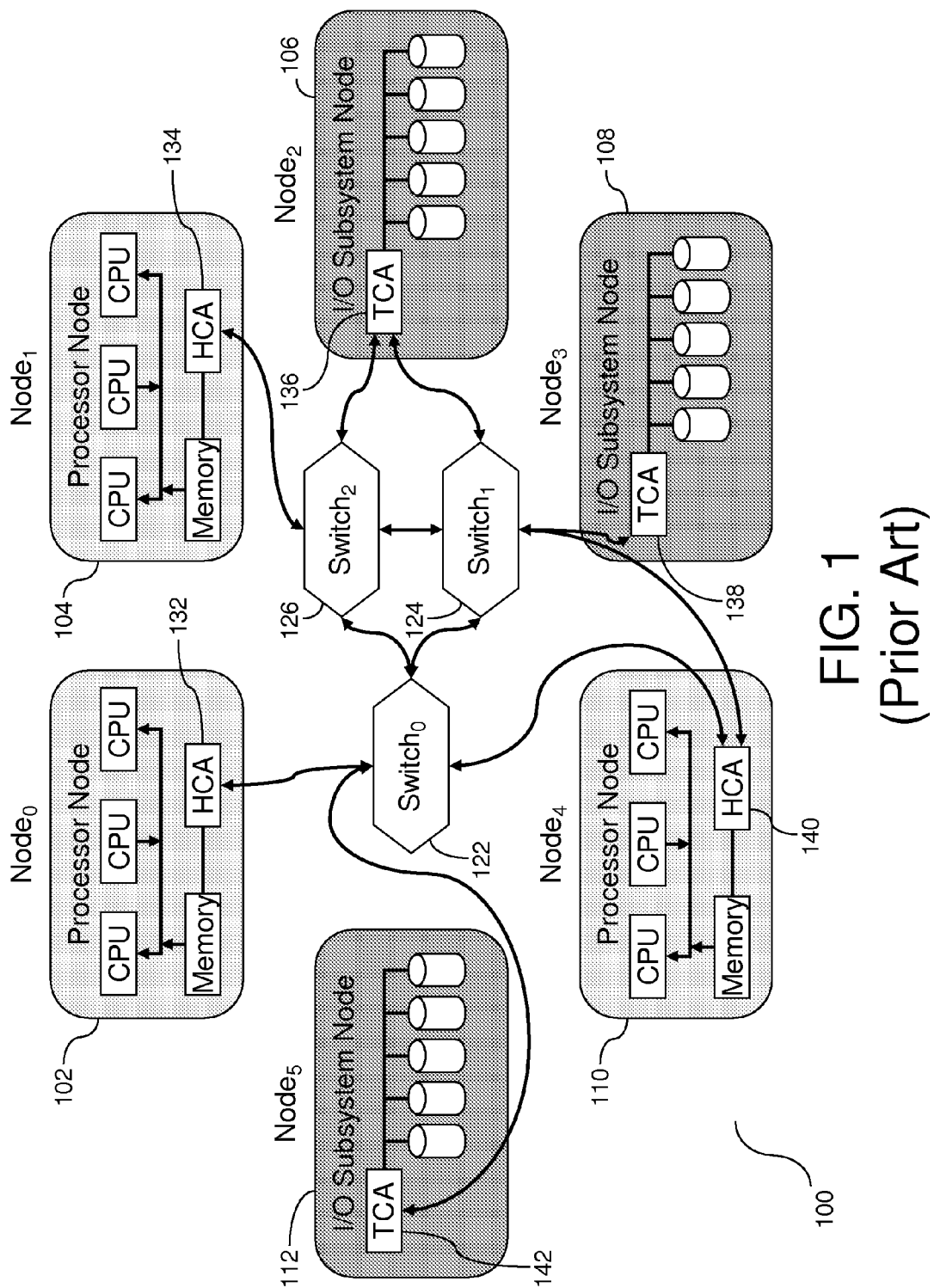
FIG. 1 is a block diagram of a prior art IB architecture.
Figure 2:
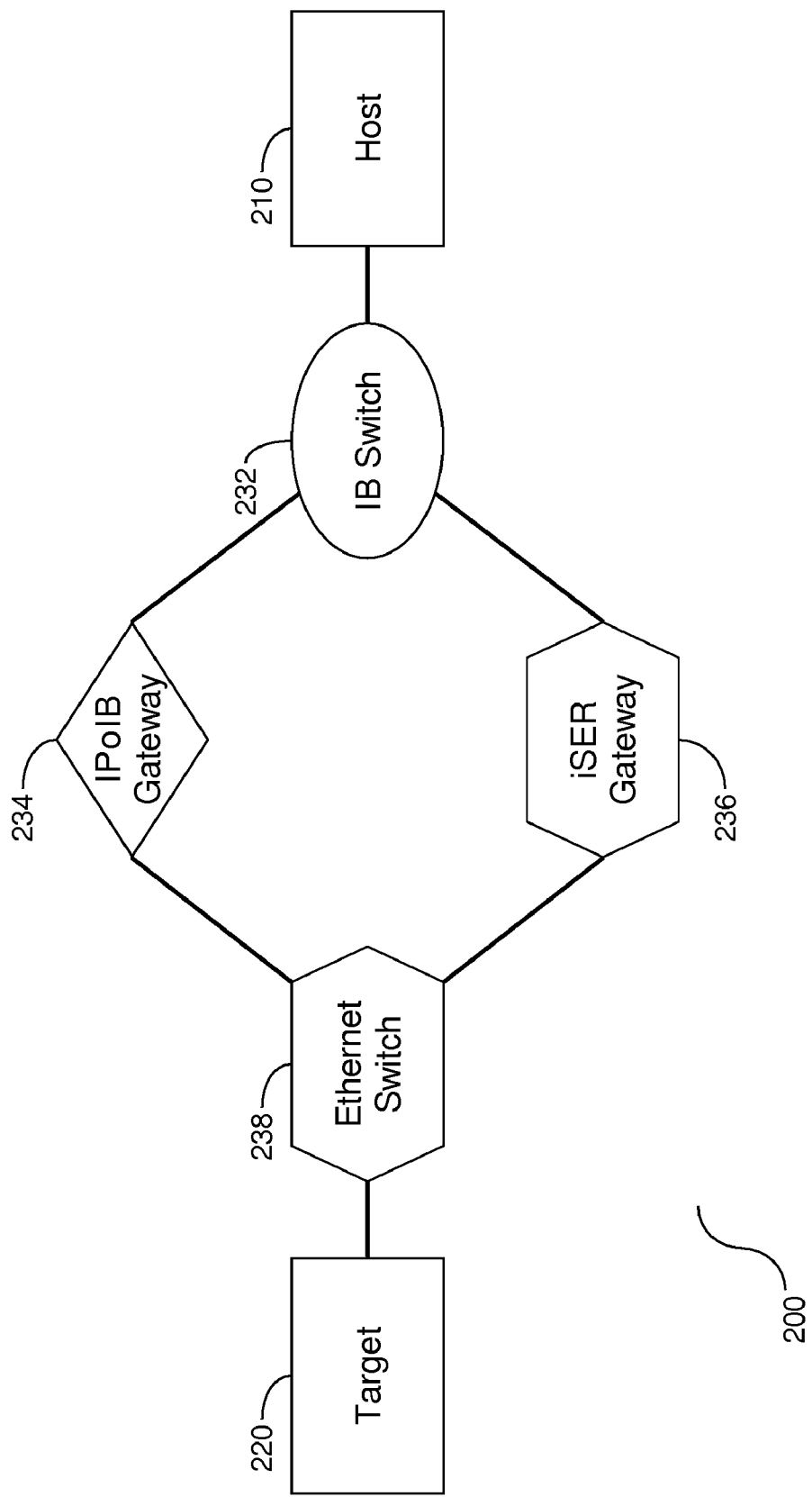
FIG. 2 is a block diagram of an IB host computer in communication with a non-IB target computer.

Technical Details iSER provides the RDMA data transfer capability to iSCSI by layering iSCSI on top of an RDMA capable protocol to provide RDMA read and write services. Such services enable data to be transferred directly into iSCSI I/O buffers without intermediate data copies. FIG. 2 is a block diagram (200) of an IB host computer (210) in communication with a non-IB target computer (220), which may or may not be a part of the IB Architecture. As shown, the host (210) is on the IB architecture and is in communication with an IB switch (232), which is in communication with both an IP over IB Gateway (234) and an iSER Gateway (236). The target (220) is in communication with a switch (238), which supports communication with both the IPoIB gateway (234) and the iSER gateway (236). In one embodiment, the switch (238) is an Ethernet switch. The iSER Gateway (236) supports RDMA communication between the IB host computer (210) and the non-IB target computer (220).

Figure 3:
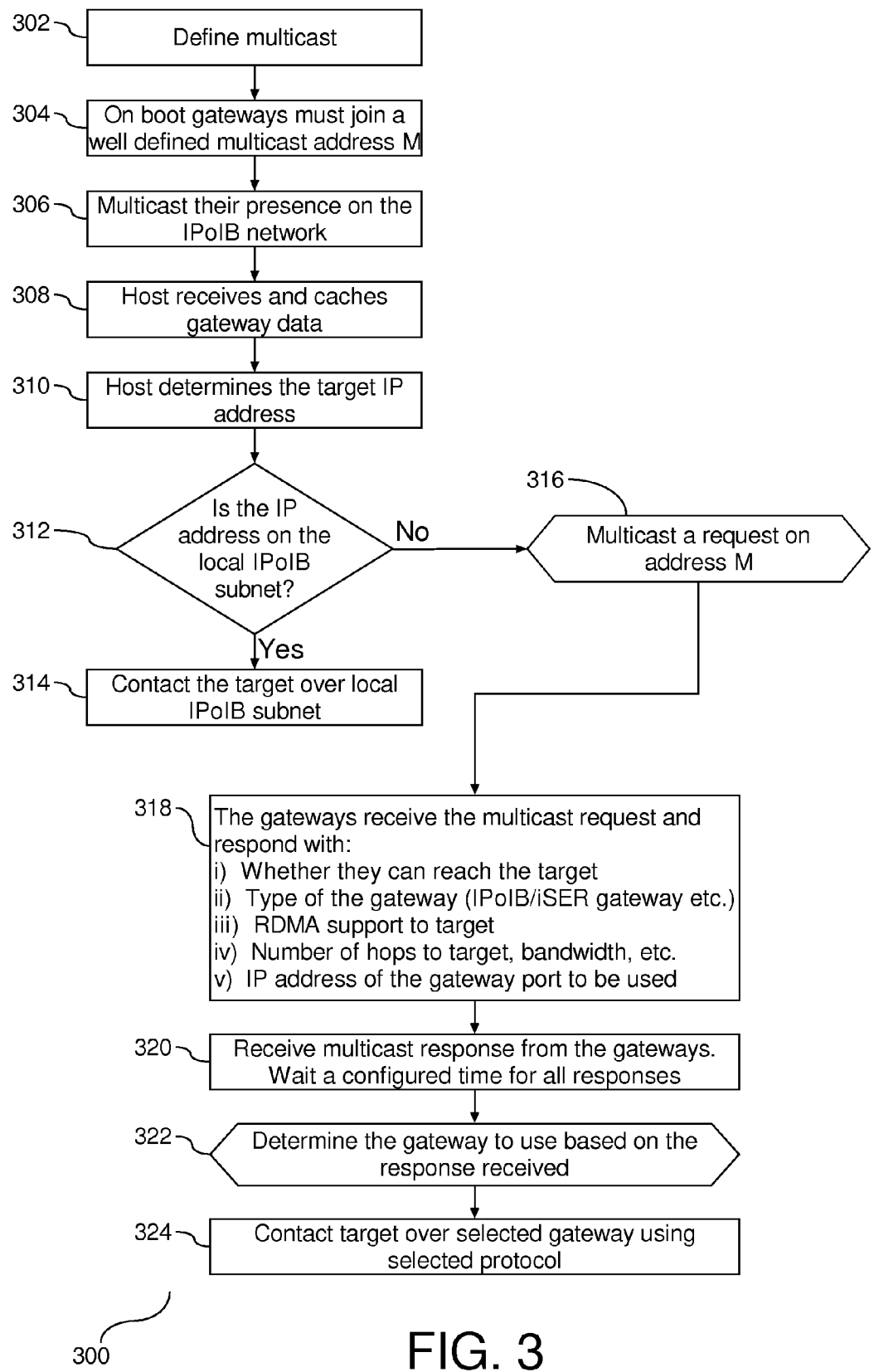
FIG. 3 is a flow chart of a data communication protocol selection according to the preferred embodiment of this invention, and is suggested for printing on the first page of the issued patent.

FIG. 3 is a flow chart (300) illustrating a process for determining an optimal communication path to transmit a data packet from an IB host computer to a non-IB target computer, such as an iSCSI target. Based upon the example of FIG. 2, there are two gateways available to transfer data between the host and the target, an IB configured gateway (234) and an iSER gateway (236). A special multicast group that all gateways in the network are required to join is defined (302). A multicast communication is a tool that supports delivery of information to a select group of destinations. When a gateway is in the process of being booted up, the gateway joins a well defined multicast address, M (304), and the gateway multicasts its presence on the IPoIB network (306). In one embodiment, the process of multicasting at step (304) applies to IPoIB gateways as well as non IPoIB gateways that are in communication with an IB network. The gateways may use different formats and tools to multicast their presence. For example, the gateways may use an IB multicast without involving IPoIB or an IPoIB multicast that uses an underlying IB layer multicast. Each host and target that is a member of the multicast stores the gateway data in their cache upon receiving the IPoIB multicast from each gateway (308). By storing the gateway data in the cache, the host mitigates periodically updating the data. In one embodiment, if there is no communication between the gateway and the host for a defined period of time or quantity of communication, the host may refresh the cache data. Accordingly, the first part of the process for communicating a data packet across networks requires that each gateway join a multicast.

Each host and target in a network of interconnected computers may transmit data packets across the network. A computer that is sending the data packet is referred to as a host and a computer that is intended to receive the data packet is referred to as a target. Each host and target in the network has a unique address to identify the respective computer and to enable data packets to be appropriately transmitted to the intended computer. Prior to transmission of a data packet, the host determines the address of the target (310). In one embodiment, the host processor uses an iSCSI name service to properly determine the address of the target. Following step (310), it is determined whether the target address is on an IPoIB subnet local to the host (312). A positive response to the determination at step (312) enables the host to contact the target over a local IPoIB subnet (314). In one embodiment, the communication at step (314) supports RDMA communication between the host and the target. However, if the response to the determination at step (312) is negative, the host delivers information pertaining to the intended transmission to the target to each of the gateways on address M (316), i.e. the host multicasts their request on address M. The information transmitted by the host may include a request for data to determine the optimal gateway for communicating with the target. Following the multicast at step (316), each gateway in receipt of the multicast responds with requested data to the host (318). The response data is used by the host to determine an optimal communication path and communication format. For example, it must be determined which gateways in receipt of the host transmission can reach the intended target. If a responding gateway cannot reach the target then it is not a gateway that should be selected for transmission of the communication. In one embodiment, the data request includes gateway configuration data, and does not require a separate data request. As shown in FIG. 2, the gateway may be an IPoIB gateway, an iSER gateway, etc. The gateway configuration data is returned to the requesting host as part of the response data. The type of gateway selected will assist in determining whether or not the gateway supports RDMA transmission. However, even if the gateway supports RDMA transmission, it must be determined if there is support for RDMA transmission from the gateway to the target. Other factors in the multicast request include the receiving address of the gateway, the bandwidth of each gateway, the number of hops from the host to the target, etc. Upon receipt of the multicast response from each of the gateways in the multicast, the host waits a specified time period to receive all of the responses (320). Based upon the responses received from the gateways in the multicast, the host determines which gateway to select for optimal data transfer to the target (322), and contacts the target over the selected gateway using the selected protocol (324). In one embodiment, the host may prefer to communicate with the target over RDMA as opposed to iSCSI if there is RDMA support through one of the gateways on the multicast and the target supports RDMA.

In one embodiment, the invention is implemented in software, which includes but is not limited to firmware, resident software, microcode, etc. The invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

Figure 4:
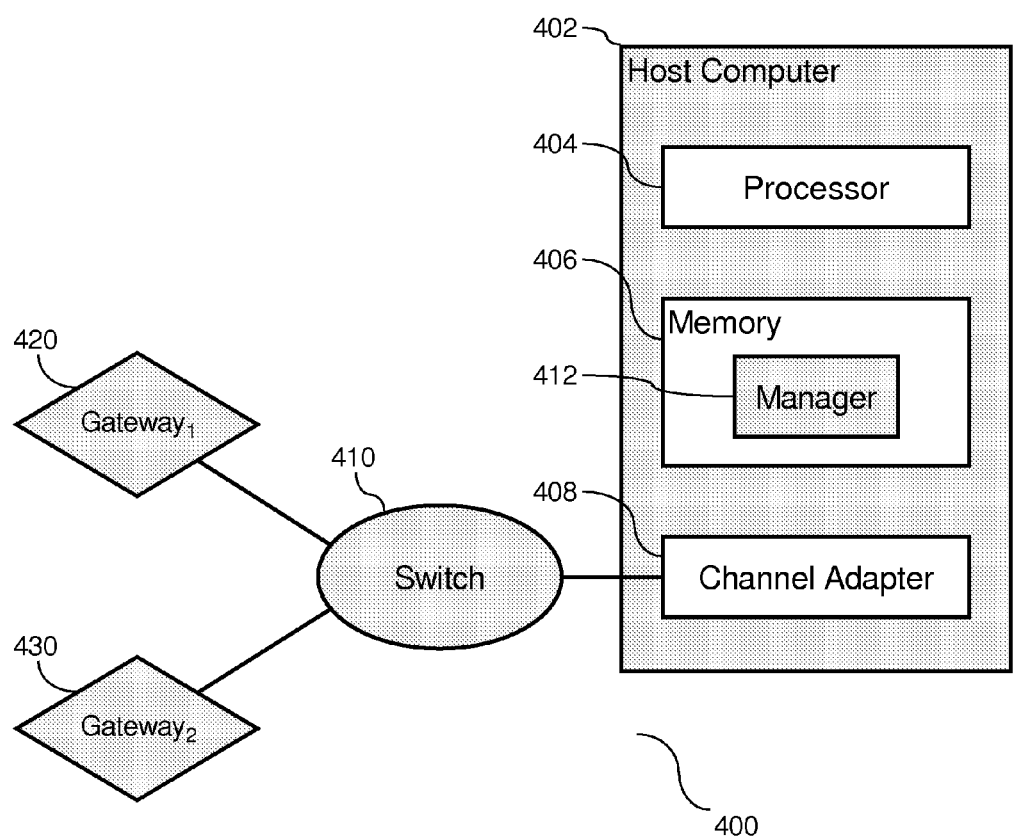
FIG. 4 is a block diagram of the host computer in communication with a target computer across a network and a manager to facilitate communication between the host and target computers.

FIG. 4 is a block diagram (400) illustrating placement of the communication selection tool in a computer system. The illustration shows a host computer (402) with a processor (404), memory (406), and a channel adapter (408) in communication with a network. As shown in FIG. 2, the host computer communicates across the network through a switch (410). The host computer is supported with inter-network communication by a gateway. In one embodiment, the switch (410) is in communication with two gateways (420) and (430). A manager (412) is shown residing in memory (406) of the host computer (402). The manager (410) may utilize instructions in a computer readable medium to select an optimal gateway to communicate data from the host computer (402) to a target computer (not shown) in communication with one of the gateways (420), (430). In one embodiment, the manager (410) sends a request to at least two gateways (420) and (430) in communication with the host computer (402) and the target computer (not shown), and based upon the responses received from the gateways (420) and (430), the manager (410) determines an optimal gateway to transmit the communication. If the target computer and at least one of the gateways are configured to accept RDMA protocol, the manager (410) will issue instructions to cause communication from the host computer to the target computer over the select gateway using RDMA. In one embodiment, the manager (410) may reside as a hardware tool external to memory (406). Accordingly, the manager (412) may be implemented as a software tool or a hardware tool to facilitate communication between a computer residing in an IB network and a computer residing external to the IB network.

Embodiments within the scope of the present invention also include articles of manufacture comprising program storage means having encoded therein program code. Such program storage means can be any available media which can be accessed by a general purpose or special purpose computer. By way of example, and not limitation, such program storage means can include RAM, ROM, EEPROM, CD-ROM, or other optical disk storage, magnetic disk storage or other magnetic storage devices, or any other medium which can be used to store the desired program code means and which can be accessed by a general purpose or special purpose computer. Combinations of the above should also be included in the scope of the program storage means.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, random access memory (RAM), read-only memory (ROM), a rigid magnetic disk, and an optical disk. Current examples of optical disks include compact disk B read only (CD-ROM), compact disk B read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks.

The software implementation can take the form of a computer program product accessible from a computer-useable or computer-readable medium providing program code for use by or in connection with a computer or any instruction execution system.

Advantages Over the Prior Art

Each of the gateways multicast their presence in the network on a specified address at time of boot and in response to a query from a host processor to determine an optimal transmission protocol to a target processor. Each host in communication with the gateway multicast maintains a cache of the gateway boot information as well as the query response data for each gateway in the network. This allows all host processors to mitigate the number of transmission on the network.

Alternative Embodiments

It will be appreciated that, although specific embodiments of the invention have been described herein for purposes of illustration, various modifications may be made without departing from the spirit and scope of the invention. In particular, if all of the gateways in the network support IPoIB, the IPoIB "broadcast GID" may be used as a multicast address. Conversely, the invention should not be limited to IPoIB and associated protocols. For example, in one embodiment, an internet protocol multicast may be used with the gateways using internet protocol daemons or agents.

Although the embodiments shown here have been described in the context of an IB network with one or two paths from the host processor to the target processor, the embodiments may also be applied to a storage area network where there are multiple paths from the host processor to the target processor. Similarly, although the description illustrates a single host computer in communication with a single target computer, the invention should not be limited to singular communication. In one embodiment, there may be multiple hosts on the network in communication with any number of target computers. Accordingly, the scope of protection of this invention is limited only by the following claims and their equivalents.

I claim:

1. A method for determining a communication path on a computer network, comprising:
    configuring a computer network with an Infini Band (IB) configured host computer in communication across said network with a non-IB configured target computer;
    providing said network with at least two separate gateways in communication with said host and target computers, a first of said gateways being an Internal Protocol over Infini Band (IPoIB) gateway and a second of said gateways being an Internet Small Computer System Interface (iSCSI) Extensions for Remote Direct Memory Access (RDMA) (iSER) gateway, wherein each gateway defines a separate communication path from the host to the target;
    determining an address of said target computer;
    selecting one of said gateways to communicate data from said host computer to said target computer based upon said determined address of said target, including:
        sending a request to said first and second gateways, receiving a response from said gateways, and
        determining an optimal communication protocol to use based upon said received response; and
    contacting said target computer over said selected gateway using a remote direct memory access protocol if said target computer and one of said gateways is configured to accept said remote direct memory access protocol.

2. The method of claim 1, further comprising contacting said target computer over a local IPoIB subnet if said address of said target computer is on said local IPoIB subnet.

3. The method of claim 1, further comprising said first and second gateways multicasting their presence on said network in communication with said host computer on boot, wherein said multicast is selected from the group consisting of: an IB multicast absent IPoIB, and an IPoIB multicast.

4. The method of claim 3, wherein the step of said gateways multicasting their presence on boot enables said host computer to store gateway data in host cache.

5. The method of claim 1, wherein said gateway response includes data selected from the group consisting of: whether said gateway can reach said target, type of gateway, Remote Direct Memory Access (RDMA) support to said target, quantity of hops to said target, bandwidth to said target, IP address of a port of said gateway, and combinations thereof.

6. The method of claim 1, further comprising contacting said target computer over said selected gateway using an iSCSI if gateways are configured to reject said remote direct memory access protocol.

7. A computer system comprising:
    an Infini Band (IB) configured host computer in communication with an Internet Small Computer System Interface (iSCSI) configured target computer across a network;
    at least two gateways in communication with said host computer and said target computer, wherein each gateway defines a separate communication path from the host to the target, and wherein a first of said gateways is an Internet Protocol over Infini Band (IPoIB) gateway and a second of said gateways is an Internet Small Computer System Interface (iSCSI) Extensions for Remote Direct Memory Access (RDMA) (iSER);
    a manager to select one of said gateways to communicate data from said host computer to said target computer based upon an address of said target computer on said network, wherein said selection includes a request message sent to said gateways from said host computer, a response message communicated to said host computer from said gateways, and a determination of an optimal gateway and communication protocol for communication with said target based upon said response message; and
    a transmission manager to contact said target computer over said selected gateway using a remote direct memory access protocol if said target computer and one of said gateways is configured to accept said remote direct memory access protocol.

8. The system of claim 7, further comprising said transmission manager to contact said target computer over a local Internal Protocol over Infini Band (IPoIB) subnet if said address of said target computer is on said local IPoIB subnet.

9. The system of claim 7, further comprising a multicast message transmitted by said gateways on boot of said host computer to broadcast presence of said gateways on said network, wherein said multicast is selected from the group consisting of: an IB multicast absent IPoIB, and an IPoIB multicast.

10. The system of claim 9, further comprising host computer cache to store said multicast message.

11. The system of claim 7, wherein said gateway response includes data selected from the group consisting of: whether said gateway can read said target computer, type of gateway, Remote Direct Memory Access (RDMA) support to said target, quantity of hops to said target, bandwidth to said target, IP address of a port of said gateway, and combinations thereof.

12. The system of claim 7, further comprising said transmission manager to contact said target computer over said selected gateway using an iSCSI if said gateways are configured to reject said remote direct memory access protocol.

13. An article comprising:
a computer network with an Infini Band (IB) configured host computer in communication across a network with an Internet Small Computer System Interface (iSCSI) configured target computer, said network having at least two separate gateways in communication with said host and target computers, a first of said gateways being an Internal Protocol over Infini Band (IPoIB) gateway and a second of said gateways being an Internet Small Computer System Interface (iSCSI) Extensions for Remote Direct Memory Access (RDMA) (iSER) gateway, wherein each gateway defines a separate communication path from the host to the target;
a tangible computer readable carrier including computer program instructions configured to determine a communication path on said network, comprising;
instructions to determine an address of said target computer;
instructions to select an optimal gateway to communicate data from said host computer to said target computer based upon said determined address of said target, including:
sending a request to said first and second gateways, receiving a response from said gateways, and
determining an optimal gateway to use based upon said received response; and
instructions to cause communication with said target computer over said selected gateway using a remote direct memory access protocol if said target computer and one of said gateways is configured to accept said remote direct memory access protocol.

14. The article of claim 13, further comprising instructions to contact said target computer over a local IPoIB subnet if said address of said target computer is on said local IPoIB subnet.

15. The article of claim 13, further comprising said first and second gateways having instructions to multicast their presence on said network in communication with said host computer on boot, wherein said multicast is selected from the group consisting of: an IB multicast absent IPoIB, and an IPoIB multicast.

16. The article of claim 15, wherein the instructions to multicast presence of said gateways on boot enables said host computer to store gateway data in host cache.

17. The article of claim 13, wherein said gateway response includes data selected from the group consisting of: whether said gateway can read said target computer, type of gateway Remote Direct Memory Access (RDMA) support to said target, quantity of hops to said target, bandwidth to said target, Internet Protocol (IP) address of a port of said gateway, and combinations thereof.

18. The article of claim 13, further comprising instructions to contact said target computer over said selected gateway using an iSCSI if gateways are configured to reject said remote direct memory access protocol.

19. A method for determining a communication path on a computer network, comprising:
configuring a computer network with a host computer in communication across said network with a target computer;
providing said network with at least two separate gateways in communication with said host and target computers, wherein each gateway defines at least two separate communication paths from the host to the target, and wherein a first of said gateways is an Internet Protocol over Infini Band (IPoIB) gateway and a second of said gateways is an Internet Small Computer System Interface (iSCSI) Extensions for Remote Direct Memory Access (RDMA) (iSER);
determining an address of said target computer;
selecting one of said gateways to communicate data from said host computer to said target computer based upon said determined address of said target, including:
sending a request to said first and second gateways, receiving a response from said gateways, and
determining an optimal communication protocol to use based upon said received response; and
contacting said target computer over said selected gateway using a remote direct memory access protocol if said target computer and one of said gateways is configured to accept said remote direct memory access protocol.

* * * * *